United States Patent
Otsuka et al.

(10) Patent No.: US 9,451,409 B2
(45) Date of Patent: Sep. 20, 2016

(54) INFORMATION PROCESSING DEVICE, INFORMATION PROVIDING METHOD, AND PROGRAM

(71) Applicant: NTT DOCOMO, INC., Tokyo (JP)

(72) Inventors: Takayuki Otsuka, Tokyo (JP); Toshiyasu Yoshimi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/407,651

(22) PCT Filed: Jun. 3, 2013

(86) PCT No.: PCT/JP2013/065412
§ 371 (c)(1),
(2) Date: Dec. 12, 2014

(87) PCT Pub. No.: WO2014/002698
PCT Pub. Date: Jan. 3, 2014

(65) Prior Publication Data
US 2015/0172867 A1 Jun. 18, 2015

(30) Foreign Application Priority Data
Jun. 27, 2012 (JP) .................................. 2012-143925

(51) Int. Cl.
*H04W 24/00* (2009.01)
*H04W 4/02* (2009.01)
(Continued)

(52) U.S. Cl.
CPC .......... *H04W 4/027* (2013.01); *G01C 21/3679* (2013.01); *H04W 4/02* (2013.01); *H04W 4/008* (2013.01)

(58) Field of Classification Search
CPC .................................................... H04W 64/00
USPC ....................................................... 455/456.3
See application file for complete search history.

(56) References Cited

U.S. PATENT DOCUMENTS 7,756,529 B2 * 7/2010 Hashimoto .......... G01C 21/005
  455/456.2
8,385,894 B2 * 2/2013 Takehara ................ H04W 4/02
  455/414.1
(Continued)

FOREIGN PATENT DOCUMENTS

JP 2003248683 9/2003
JP 2007078565 3/2007
(Continued)

OTHER PUBLICATIONS

PCT International Search Report issued in International Application No. PCT/JP2013/065412, date mailed Jul. 2, 2013, pp. 1-2.
(Continued)

Primary Examiner — Santiago Garcia
(74) Attorney, Agent, or Firm — MKG, LLC (57) ABSTRACT

A mobile terminal guides a user to a destination by a navigation application and outputs destination information indicative of a destination upon arrival at the destination to information providing application and executes the information providing application. The mobile terminal on which the information providing application is running, determines whether the mobile terminal is staying at the destination by a motion sensor and starts counting a staying time. When the counted staying time reaches a predetermined length of time, the mobile terminal send to the user an inquiry to confirm that the present location is the destination. Upon confirmation that the user has been staying at the destination for a predetermined length of time, the mobile terminal transmits destination information to a server, obtains facility information corresponding to destination information, and outputs the obtained facility information.

8 Claims, 4 Drawing Sheets

(51) Int. Cl.
*G01C 21/36* (2006.01)
*H04W 4/00* (2009.01)

(56) References Cited

U.S. PATENT DOCUMENTS

| | | | | |
|---|---|---|---|---|
| 8,761,799 | B2* | 6/2014 | Meredith | H04W 12/06 455/456.1 |
| 2001/0056327 | A1 | 12/2001 | Jin | |
| 2002/0098829 | A1* | 7/2002 | Tendler | G06Q 40/04 455/410 |
| 2005/0113115 | A1* | 5/2005 | Haberman | H04L 65/4076 455/456.3 |
| 2006/0259240 | A1* | 11/2006 | Hashimoto | G01C 21/005 701/469 |
| 2007/0262860 | A1 | 11/2007 | Salinas et al. | |
| 2008/0133260 | A1 | 6/2008 | Fukui et al. | |
| 2009/0068992 | A1* | 3/2009 | Takehara | H04W 4/02 455/412.1 |
| 2011/0111787 | A1* | 5/2011 | Hapsari | G08B 27/006 455/521 |
| 2012/0284779 | A1* | 11/2012 | Ingrassia, Jr. | G06F 21/70 726/5 |
| 2012/0290383 | A1* | 11/2012 | Busch | G06Q 30/02 705/14.36 |
| 2015/0141055 | A1* | 5/2015 | Barrand | H04W 4/02 455/456.3 |

FOREIGN PATENT DOCUMENTS

| | | |
|---|---|---|
| JP | 2008140165 | 6/2008 |
| JP | 2009-129048 A | 11/2009 |
| JP | 2010039952 | 2/2010 |
| JP | 2010041469 | 2/2010 |
| JP | 2010252273 | 11/2010 |
| JP | 2011-221955 A | 4/2011 |
| JP | 2011-118458 A | 6/2011 |

OTHER PUBLICATIONS

Notice of Reasons for Rejection for Japanese Patent Application No. 2014-522505, dated Mar. 17, 2015.
Extended European Search Report for EP Patent Application No. 13808579.0-1853/2869606 PCT/JP2013/065412, dated Aug. 4, 2015.

* cited by examiner

INFORMATION PROCESSING DEVICE, INFORMATION PROVIDING METHOD, AND PROGRAM

TECHNICAL FIELD

The present invention relates to notification of information corresponding to a location.

BACKGROUND

A technology of providing a user with information depending on a location of the user is disclosed in JP-A-2010-041469. In JP-A-2010-041469, a location of a mobile terminal is detected at a predetermined interval to receive information corresponding to a time period during which the user stays at the location from a server, and the received information is displayed.

The technology disclosed in: JP-A-2010-041469, aims to receive facility information corresponding to a position of a mobile terminal, and select the facility information based on personal information of the user, preference information, or the like (refer to FIG. 4). Thus, there is a possibility that the selected facility information, which reflects the attributes or preferences of the user, is not information of a facility at which the user has actually visited in a case where two or more pieces of the facility information is associated with a location according to the technology of: JP-A-2010-041469.

SUMMARY

The present invention aims to provide a person who is more likely to actually visit the location of which location information is provided.

According to an aspect of the present invention, there is provided an information processing device including: a first determination unit that determines whether a mobile terminal is situated in a predetermined location based on a result of predetermined processing executed by the mobile terminal using location information; a second determination unit that determines whether the mobile terminal has been staying at the location for a predetermined length of time upon determination of existence of the mobile terminal at the predetermined location, which is performed by the first determination; and an execution unit that executes processing to output information corresponding to the location, upon determination of a stay of the mobile terminal at the predetermined location for the predetermined length of time, which is performed by the second determination unit.

In a preferable embodiment, the processing is configured to guide the user of the mobile terminal to a destination; and the first determination unit determines that the mobile terminal is situated at the predetermined location when the user arrives at the destination.

In another preferable embodiment, when a predetermined condition with regard to determination of a stay of the mobile terminal is satisfied, the second determination unit sends to the user of the mobile terminal an inquiry as to a current location and determines that the mobile terminal has been staying at the location for the predetermined length of time upon receipt of a reply indicating that the user is at the location.

In yet another preferable embodiment, the mobile terminal comprises a sensor that senses a motion of the mobile terminal; and the second determination unit determines the predetermined condition based on a result of the sensing performed by the sensor.

In yet another preferable embodiment, the second determination unit starts measurement of the staying time when the motion sensed by the sensor is less than a threshold, which indicates that the user is in the same location.

In yet another preferable embodiment, the predetermined location includes two or more locations; and the second determination unit performs the determination based on the predetermined length of time, which is variable depending on a location determined by the first determination unit.

In yet another preferable embodiment, the second determination unit changes the predetermined length of time depending on a date and/or time at which the determination is performed.

A method of providing information according to the present invention, includes: a first step of determining whether a mobile terminal is situated in a predetermined location based on a result of predetermined processing executed by the mobile terminal using location information; a second first step of determining whether the mobile terminal has been staying at the location for a predetermined length of time upon determination of existence of the mobile terminal at the predetermined location, which is performed in the first step; and a third step of executing processing to output information corresponding to the location, upon determination of a stay of the mobile terminal at the location for the predetermined length of time, which is performed in the second step.

A program according to the present invention causes a computer to execute: a first step of determining whether a mobile terminal is situated in a location based on a result of predetermined processing executed by the mobile terminal using location information; a second first step of determining whether the mobile terminal has been staying at the location for a predetermined length of time upon determination of existence of the mobile terminal at the predetermined location, which is performed in the first step; and a third step of executing processing to output information corresponding to the location, upon determination of a stay of the mobile terminal at the location for the predetermined length of time, which is performed in the second step.

According to the present invention, it is possible to provide a person who was likely to have actually stayed in an area with information relating to the area with higher accuracy.

DETAILED DESCRIPTION

[Embodiment]

Figure 1:
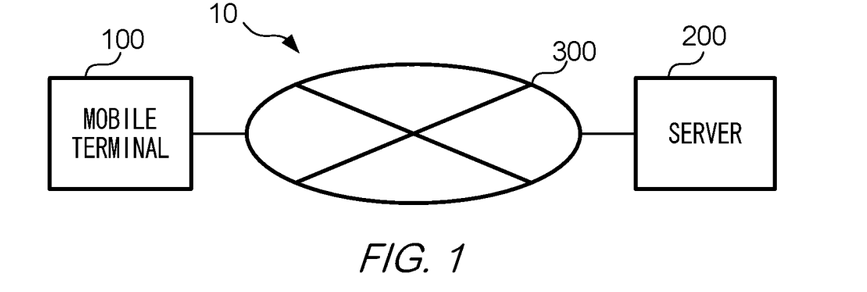
FIG. 1 is a block diagram showing an overall configuration of an information providing system.

FIG. 1 is a block diagram showing an overall configuration of an information providing system 10 according to an exemplified embodiment of the present invention. Information providing system 10 includes a mobile terminal 100 and server 200, which can be communicated with each other via a network 300. Two or more mobile terminals 100 and/or servers 200 may be included in the system.

Mobile terminal 100 is a communication terminal carried by a user and is configured to output information to notify the user of the information. For example, mobile terminal 100 is a wireless communication terminal including a smartphone and a tablet terminal. Mobile terminal 100 may be a laptop PC, portable game console, portable audio player, or the like.

Figure 2:
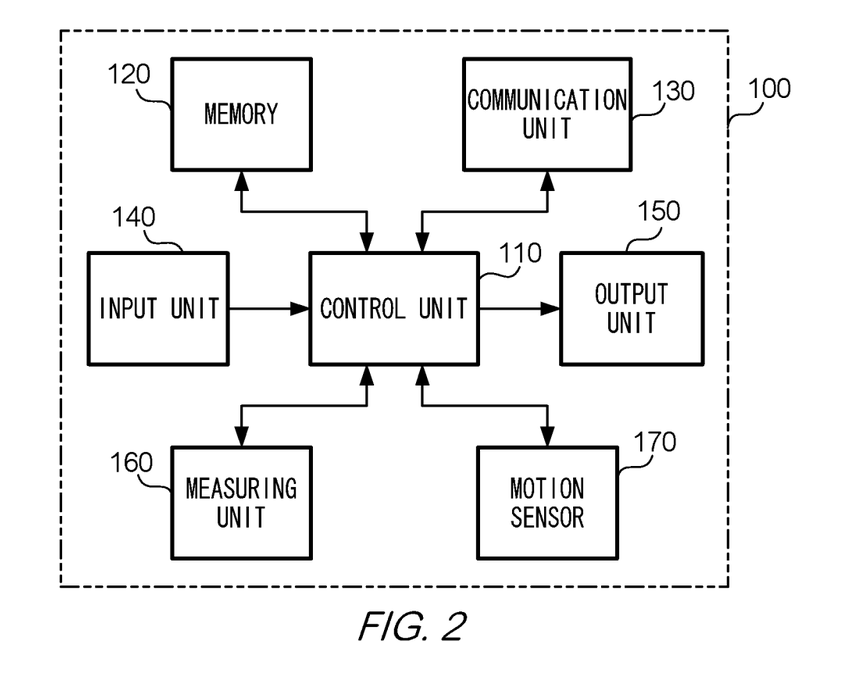
FIG. 2 is a block diagram showing a hardware configuration of a mobile terminal.

FIG. 2 is a block diagram showing a hardware configuration of mobile terminal 100. Mobile terminal 100 includes a control unit 11, memory 120, communication unit 130, input unit 140, output unit 150, measuring unit 160, and motion sensor 170.

Control unit 110 controls an operation of mobile terminal 100. Control unit 110 includes a CPU (Central Processing Unit), GPU (Graphics Processing Unit) or other processing devices, memory, and the like, to execute a program(s) for controlling mobile terminal 100. The programs executed by control unit 110 include an application (hereinafter referred to as "a navigation application") to guide the user to a destination based on location information and an application (hereinafter referred to as "information providing application") to provide the user with facility information.

Memory 120 stores data. Memory 120 includes a non-volatile storage medium including a hard drive, flash memory, or the like. The data stored in memory 120 includes a program(s), which can be executed by control unit 110, and facility information. Memory 120 may include a memory card, i.e., a detachable storage medium to store the program(s) and/or the facility information.

Communication unit 130 communicates server 200 via network 300 to transmit and receive data. Communication unit 130 includes an antenna and modem configured to conform to a communication protocol used for network 300, so as to execute processing for data communication, which may include modulation and demodulation of data.

Input unit 140 receives an input of data, which is made by a user. Input unit 140 may be a keypad including a full keyboard and ten keys. Alternatively, input unit 140 may include a sensor implemented in a touch screen formed on a display element. Input unit 140 may include a microphone to input a user's instruction by voice in a case where mobile terminal 100 has a functionality of voice recognition. Input unit 140 outputs the input information representative of a user's instruction to control unit 110.

Output unit 150 outputs data. In the exemplified embodiment, output unit 150 includes a display configured to display an image. It is noted that outputting data does not only mean a display or an image. For example, output unit 150 may output data in the form of sound via a speaker.

Measuring unit 160 obtains location information. The location information is associated with a position. In the exemplified embodiment, the location information indicates a position of mobile terminal 100 by a latitude and longitude. Measuring unit 160 obtains location information using a GPS (Global Positioning System) or other known positioning systems. Measuring unit 160 outputs the obtained location information to control unit 110.

Motion sensor 170 detects a motion of mobile terminal 100. Motion sensor 170 includes at least one of sensors including an acceleration sensor, gyro sensor, direction sensor, and geomagnetic sensor. Motion sensor 170 outputs motion information indicative of a motion of mobile terminal detected by the sensor(s) to control unit 110.

Server 200 is a computer device that distributes facility information to mobile terminal 100. Facility information is information relating to a store(s) and/or facility(ies) (hereinafter simply referred to as "a facility") in a predetermined location. For example, facility information may include the latest news of a facility and/or introduction of products and/or services provided at the facility. In one embodiment, the facility information may be an electronic coupon available at the facility.

Figure 3:
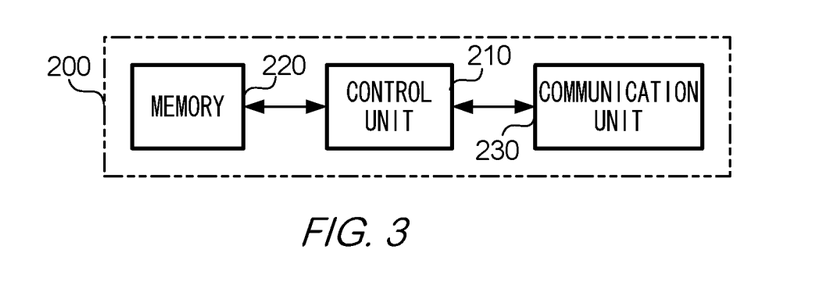
FIG. 3 is a block diagram showing a hardware configuration of server.

FIG. 3 is a block diagram showing a hardware configuration of server 200. Server 200 includes a control unit 210, memory 220, and communication unit 230. Control unit 210 is configured to control server 200 by executing a program(s). Memory 220 stores data including the facility information. Communication unit 230 communicates via network 300 with mobile terminal 100 to transmit and receive data. It is possible to store facility information in a database outside server 200.

Facility information inherits an association with location information. For example, facility information includes location information as metadata. Alternatively, a table defining an association between facility information and location information is sorted in server 200. In the exemplified embodiment, server 200 determines an association between the facility information and the location information by referring to the table.

Figure 4:
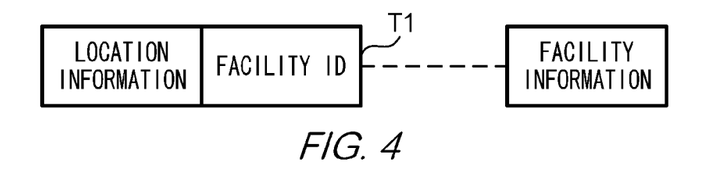
FIG. 4 shows an example of an association between facility information and location information, which is defined by a table.

FIG. 4 shows an example of a table T1 defining an association between the facility information and the location information. The facility information is uniquely identified by a facility ID. As shown in the figure, a facility ID is associated with a piece of location information. It is not necessary that a facility is located in a place suitable for identifying by latitude and longitude. It may be a case where the facility is located in an area corresponding to a certain range of latitude and longitude, since the facility is built on its large premises, for example. In this case, the location information may be configured to describe any position in a predetermined area.

Network 300 is a computer network by which mobile terminal 100 and server 200 communicate with each other. Network 300 may include two or more smaller networks. Network 300 includes at least a wireless network for communication with mobile terminal 100. For example, the wireless network is network accommodating mobile communication terminals or public wireless local area networks (LANs).

The above descriptions are related to a configuration of information providing system 10. In this system, a user firstly inputs destination information to mobile terminal 100 and then starts moving from a present location to the destination. Supposing that the destination information input by the user is selected from the registered facilities, the user may walk and/or take any form of transportation(s), alone or in combination, to get to the destination.

During the movement towards the destination, mobile terminal 100 guides the user by notifying a user of a way to the destination. For example, mobile terminal 100 displays a route to the destination by a text and an image (map), to prompt the user to continue moving towards the destination. In one embodiment, mobile terminal 100 indicates the destination and the present location on the map and updates the present location in accordance with a movement of the user while guiding the user to the destination.

When the user arrives at the destination, mobile terminal 100 determines whether the user is staying in the destination according to predetermined criteria. Upon determination that the user has stayed at the destination, mobile terminal 100 displays the facility information. It is to be noted that when the user is "staying" as described above, it means that a location of the user is maintained for a certain period of time. In other words, mobile terminal 100 estimates whether the user has visited a facility specified as the destination to purchase goods or to obtain a service at the facility, or merely has passed through the facility. When it is estimated that the user has stayed at the facility, facility information is displayed.

Figure 5A:
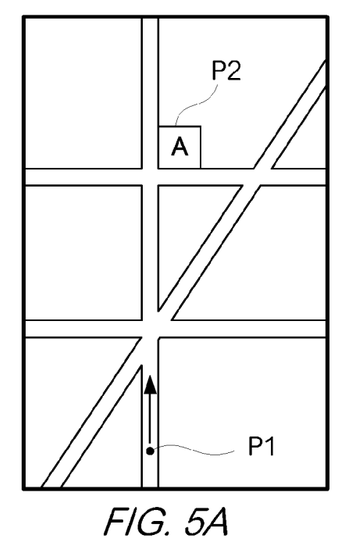
FIGS. 5A to 5D show examples of screen transitions occurring in a display of mobile terminal.
Figure 5B:
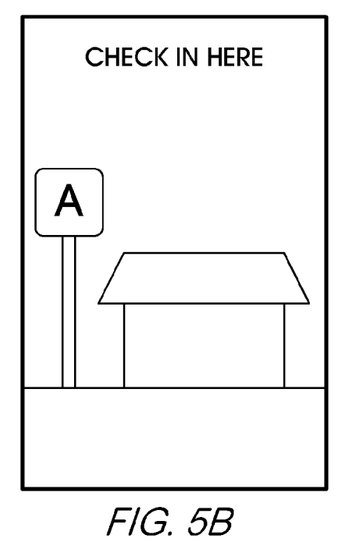

FIGS. 5A to 5D show examples of screens displayed at mobile terminal 100, as a result of the operation described above. FIG. 5A shows an example of a screen to guide the user by showing a route, in which the destination and the present location are indicated on a map. In the map, P1 and P2 indicate the present location and the destination, respectively. FIG. 5B shows an example of a screen displayed when the user destination arrives at the destination. In this example, the user performs a predetermined operation when arriving at the destination (hereinafter referred to as "check-in"), so as to input information to mobile terminal 100, representing that the user is currently at the destination.

Figure 5C:
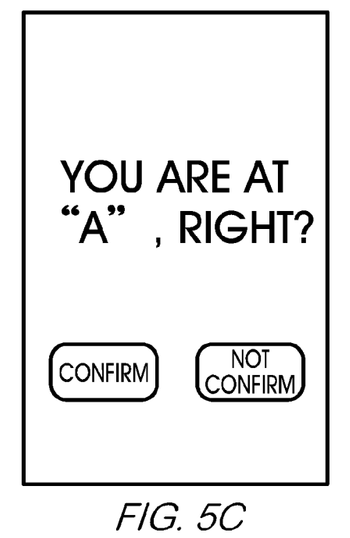
Figure 5D:
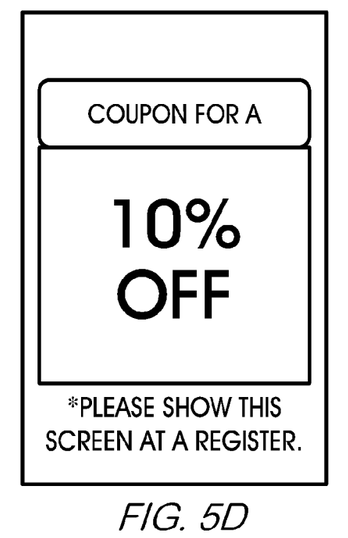

When mobile terminal 100 determines that the user is staying at the destination by checking that a predetermined length of time has passed after arrival at the destination, a screen shown in FIG. 5C is displayed to prompt the user to confirm the location. When receiving a user's input indicating that the user is staying at the destination, mobile terminal 100 displays the facility information (coupon, in this example) as shown in FIG. 5D.

Figure 6:
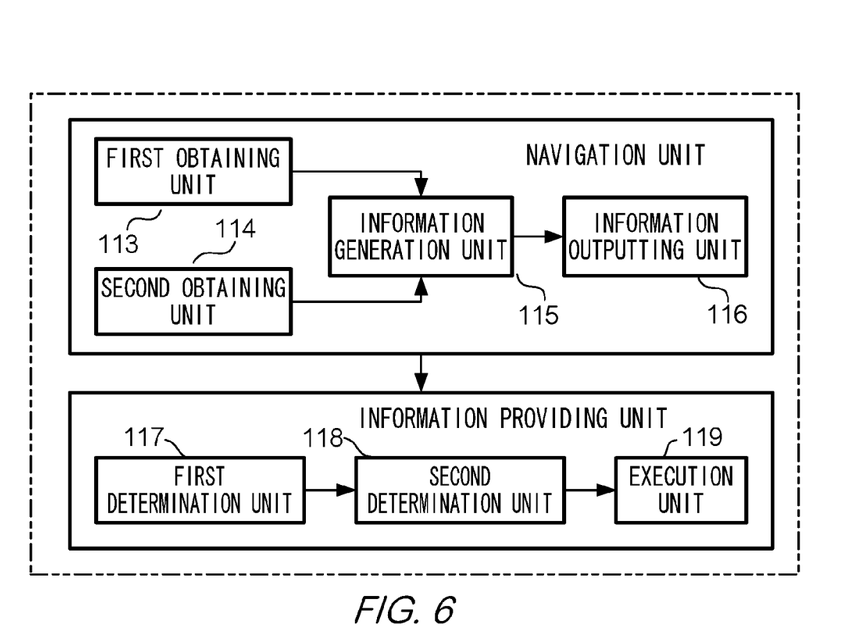
FIG. 6 is a block diagram showing a functional configuration of a mobile terminal.

FIG. 6 is a block diagram showing a functional configuration of mobile terminal 100. The configuration shown in the figure relates in particular to a determination of staying at a destination and an output (display) of facility information. Control unit 110 of mobile terminal 100 executes a program(s) to implement the functionalities of navigation unit 111 and information providing unit 112. Navigation unit 111 includes a first obtaining unit 113, second obtaining unit 114, information generation unit 115, and information outputting unit 116. Information providing unit 112 includes a first determination unit 117, second determination unit 118, and execution unit 119. Navigation unit 111 and information providing unit 112 are implemented by the navigation application and the information providing application, respectively. Alternatively, the functionalities are implemented by a single application program.

First obtaining unit 113 and second obtaining unit 114 obtain location information. More specifically, first obtaining unit 113 obtains location information of the destination designated by the user, whereas the second obtaining unit 114 obtains location information obtained by measuring unit 160, which indicates a present location of mobile terminal 100. Hereinafter, to identify the two types of location information described above, the location information obtained by first obtaining unit 113 is referred to as "destination information" and location information obtained by second obtaining unit 114 is referred to as "present location information."

Information generation unit 115 generates route guidance information. The route guidance information is information used for guiding the user to the destination. Information generation unit 115 generates, based on destination information obtained by first obtaining unit 113 and present location information obtained by second obtaining unit 114, an image data of a map in which the present location and the destination or other route information suitable for guiding the user to the destination, are indicated. Additionally, information generation unit 115 may generate audio data corresponding to a voice recording as in "Turn right at the next crossing."

Information outputting unit 116 outputs the route guidance information generated by information generation unit 115. Specifically, the route guidance information is output to output unit 150. Additionally, when the user terminates the guidance after arrival at the destination, information outputting unit 116 outputs information indicative of the arrival to the information providing unit 112. In the exemplified embodiment, information outputting unit 116 outputs the destination information to information providing unit 112. Upon receipt of the destination information, information providing unit 112 determines whether the user is staying in a predetermined location and executes processing according to a result of the determination.

First determination unit 117 determines whether mobile terminal 100 is in a predetermined location. In the exemplified embodiment, the predetermined location is the destination set by the navigation application. After it is determined that mobile terminal 100 is in the predetermined location, second determination unit 118 determines whether mobile terminal 100 is staying there for a predetermined length of time. The predetermined length of time can be set to any value. In the exemplified embodiment, the predetermined length of time is set to 10 minutes. In other embodiment, the predetermined length of time can be changed, which will be described later.

When a predetermined condition (or two or more conditions, preferably) is satisfied, second determination unit 118, determines that mobile terminal 100 has been staying at the predetermined location for the predetermined length of time. Specifically, second determination unit 118 determines a first condition as to whether mobile terminal 100 is staying in a same position is satisfied, and starts measuring a time when the first condition is satisfied. More specifically, second determination unit 118 utilizes the motion information output by motion sensor 170 for the determination of the first condition.

Next, second determination unit 118 sends to the user an inquiry as to whether a second condition in which the user is still in the destination after the predetermined length of time (staying time) has passed, is satisfied. Upon receipt of a response from the user indicating that the user is still in the destination, second determination unit 118 determines that the user has been staying at the destination for the predetermined length of time. Optionally, second determination unit 118 may obtain location information from measuring unit 160 to determine whether the user is still in the destination based on the obtained location information. In this case, the determination of staying for the predetermined length of time may be performed based on the response of the user and the obtained location information.

When second determination unit 118 determines that the user has been staying at the predetermined location (i.e., destination) for the predetermined length of time, execution unit 119 executes processing for outputting facility information of the location. Specifically, in the exemplified embodiment, execution unit 119 transmits the destination information to server 200, to obtain facility information corresponding to the destination information. Next, execution unit 119 outputs the obtained facility information to output unit 150 so as to cause output unit 150 to output the obtained facility information.

Figure 7:
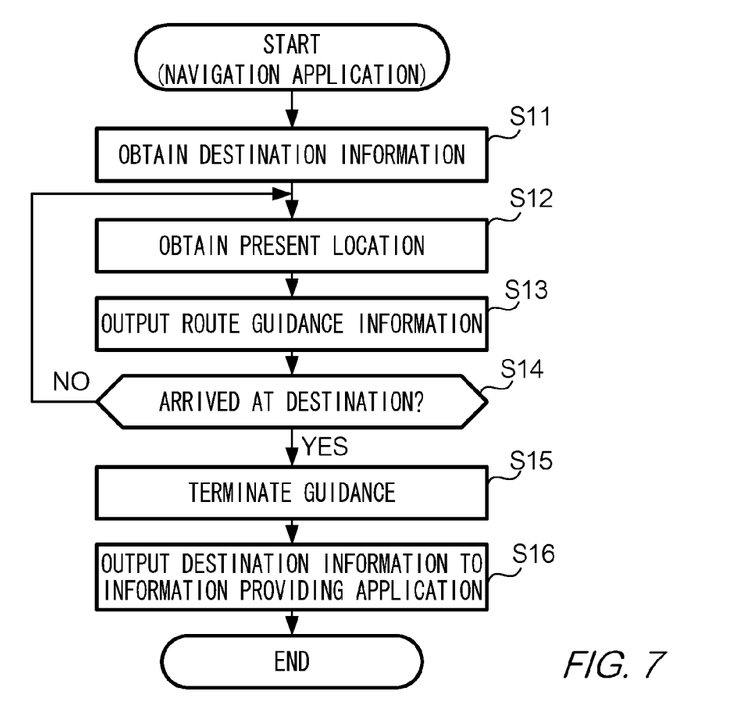
FIG. 7 is a flowchart showing an example of processing executed by a mobile terminal.
Figure 8:
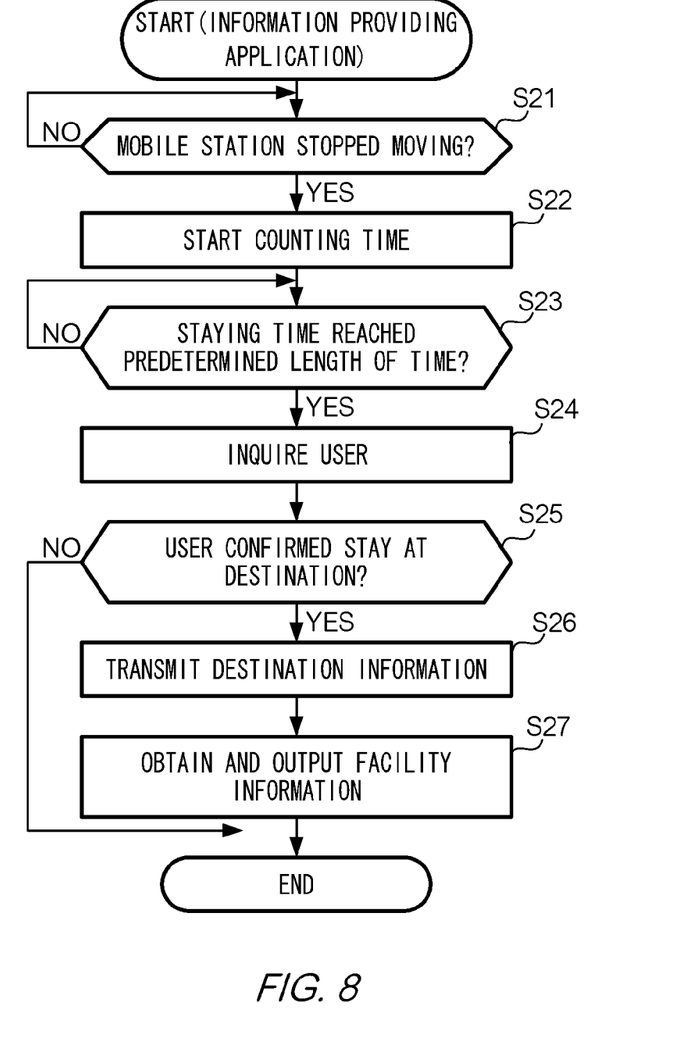
FIG. 8 is a flowchart showing an example of processing executed by a mobile terminal.

FIGS. 7 and 8 are flowcharts showing examples of processing executed by mobile terminal 100. Processing shown in FIG. 7 corresponds to the functionality of navigation unit 111 and processing shown in FIG. 8 corresponds to the functionality of information providing unit 112. Supposing that both the processings described above are executed when the user carrying mobile terminal 100 is located in a place other than the destination.

The user executes the navigation application at a certain location to input the destination. The destination may be specified by inputting a name and/or address of a facility or by designating a point of location displayed on a map. Upon completion of an input of the destination made by the user, control unit 110 of mobile terminal 100 obtains destination information (step S11). For the sake of explanation, a facility ID is uniquely identified by a piece of destination information in the exemplified embodiment. To put it otherwise, obtainment of the destination information enables mobile terminal 100 to identify a facility ID and/or name of facility, or other information on the facility, which correspond to the location. Optionally, information providing application may provide a functionality of identifying a facility ID, name of facility, and the like, based on the destination information.

Upon obtainment of the destination information, control unit 110 initiates measurement of a location to obtain location information of a present location (step S12), and outputs route guidance information (step S13). The route guidance information enables the user to understand whether the user has arrived at the destination or distance to the destination. For example, the route guidance information is presented as an image on a screen as shown in FIG. 5A.

Next, control unit 110 iterates the measurement by a predetermined length of time (for example, a few seconds) to maintain guiding the user until mobile terminal 100 (and the user) arrives at the destination. Specifically, control unit 110 checks whether the user has arrived at the destination by matching the destination information and the present location information (step S14). In a case where the user has not yet arrived, the process of step S12 and the subsequent processes are repeated. In one embodiment, a margin of error (for example, a few meters) may be allowed in the matching of destination information and the present location information to determine whether they are identical. In this case, control unit 110 compares the destination information with the present location information and checks whether a difference in locations (distance) indicated by the two pieces of information is less than a predetermined threshold in step S14.

When the user arrives at the destination, control unit 110 terminates the guidance (step S15). Specifically, the termination may be effected when the user performs the checking-in operation described above. Alternatively, the termination may be effected by confirming the arrival based on the destination information and the present location information. Next, control unit 110 executes the information providing application and terminates the navigation application. Control unit 110 transfers the destination information between the applications (step S16). To put it otherwise, the information providing application is executed upon termination of the navigation application and obtainment of receipt of the destination information from the navigation application. In one embodiment, the updated present location information obtained in step S12 may be provided to the information providing application instead of the destination information. The information providing application and the updated present location information are deemed substantially equivalent.

FIG. 8 shows a series of processes performed by the information providing application. Control unit 110 starts the series of processes upon receipt of the destination information from the navigation application. Firstly, control unit 110 determines whether the first condition is satisfied (step S21). Specifically, control unit 110 determines whether a movement (a change in its position, for example) of mobile terminal 100 lies within a predetermine range enough to estimate that mobile terminal 100 has stopped moving by referring to motion information supplied by motion sensor 170. Control unit 110 iterates the determination until it is determined that a movement of mobile terminal 100 lies within the predetermine range. As a result, control unit 110 does not perform subsequent processes until the user mobile terminal 100 substantially stops moving.

When the first condition is satisfied, control unit 110 starts measurement of a staying time (step S22). Next, control unit 110 checks whether the second condition is satisfied. Specifically, control unit 110 checks whether the staying time reaches the predetermined length of time (step S23). If the staying time reaches the predetermined length of time, control unit 110 inquires the user whether the present location matches the estimation (step S24). For example, in a case where a location represented by "A" has been set by the navigation application, control unit 110 causes output unit 150 to output a message such as "Please confirm you are in "A" so as to prompt the user to reply with an answer either "Confirm" or "Not confirm", as shown in FIG. 5C.

Control unit 110 determines whether the user has been staying at the destination for the predetermined length of staying time based on the reply from the user (step S25). Control unit 110 may perform the measurement once again to obtain the location information, and compares the obtained location information with the destination information. In this case, data with high reliability is used for the determination in addition to the response from the user.

There is a possibility that a measurement of location by means of GPS does not work when the user is inside a facility. In this regard, a measuring method other than a GPS may be implanted to control unit 110 to change measuring methods when necessary. For example, a measuring method (generally referred to as "a base station positioning") based on a position of a base station from which mobile terminal 100 receives a radio may be implemented. Alternatively, when mobile terminal 100 is configured to communicate with access points of a wireless LAN a measurement based on identification information of a radio access point may be implemented.

When the user replies that the present location is equivalent to the destination, control unit 110 outputs the destination information and causes communication unit 130 to transmit to server 200 (step S26). Upon receipt of the destination information (i.e., location information), server 200 reads facility information corresponding to the location information and transmits the facility information to mobile terminal 100. Upon receipt of the facility information via communication unit 130, control unit 110 of mobile terminal 100 causes output unit 150 to output the facility information (step S27). The facility information is displayed, an example of which is shown in FIG. 5D. If the user replies that the present location is not the destination, control unit 110 terminates the series of processes.

According to the exemplified embodiment, since the determination whether the user is in the predetermined location is performed based on the destination information set in the navigation application, the reliability that the facility information provided to the user corresponds to a facility actually visited by the user will increase. Additionally, since the destination information set by the navigation application can be used for determining whether the user is staying at a facility, it is not necessary for the user to input instructions for the determination. To put it otherwise, it is not necessary for the user to input explicit instructions for executing the information providing application. As a result, the functionality of the information providing application is provided while the user is not necessarily aware that the information providing application is running.

According to the exemplified embodiment, in a case where it is determined that the user is staying (i.e., maintaining the position within a certain area) by determining a motion of the user based on the motion information provided by motion sensor 170, a measurement of a staying time starts. By doing so, facility information is not provided to a user who visited a predetermined location but did not stay at the predetermine location, in such a case where the user merely passed through the predetermined location. For example, when distributing a coupon or other privileges as the facility information, a free rider trying to get facility information without staying at the facility can be excluded.

Additionally, according to the exemplified embodiment, since a user is asked whether the present location matches the destination when the staying time reaches the predetermined length of time, transmission of incorrect facility information corresponding to a finality at which the user has not stayed without confirmation by the user will be prevented.

Modified Embodiment

It is possible to implement the present invention in embodiments other than the exemplified embodiment described above. Examples of the other embodiments will be described below. The examples provided below can be taken alone or in combination if it is necessary.

Details of the facility information may be changed according to a predetermined condition. For example, server 200 changes a content of the facility information depending on a day of a week, period of time in a day, or other conditions relating to time and date. Server 200 may change a content of the facility information based on a staying time at the facility. As an example, server 200 issues a higher discount value of a coupon for a user staying longer.

Figure 9:
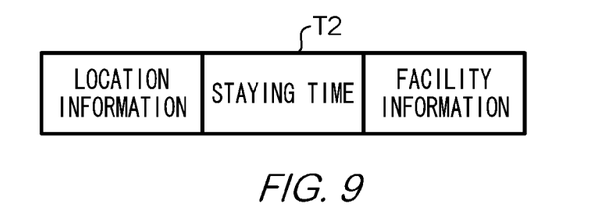
FIG. 9 shows an example of an association between facility information and location information defined by the table.

FIG. 9 shows an example of a table T2 defining an association between the facility information and the location information. Table T2 is used to define uniquely a piece of the facility information by a combination of the location information and the staying time. In this case, the facility information of a facility can vary depending on a staying time at the facility. In another embodiment, it is possible to write date and time of a stay instead of a staying time in table T2 shown in FIG. 9, so as to change the facility information depending on date and time. As an example, different contents of the facility information can be provided to a user who visited there in the daytime and a user who visited there at night.

The staying time used in determination of a stay at a facility may depend on a date and time of the stay or a location of the facility. In this case, mobile terminal 100 specifies a threshold for a staying time in advance and utilizes the threshold for the determination. Specifically, mobile terminal 100 transmits the destination information to server 200 and obtains a threshold of a staying time for facility information corresponding to the destination information from server 200 before the series of process shown in FIG. 8 starts.

It is preferable to determine whether a user has moved away from an area in addition to whether the user is staying within an area, so the staying time is determined more precisely. In this regard, mobile terminal 100 may be configured to repeatedly obtain the location information. After the user has left the destination, mobile terminal 100 calculates a period of time starting from an arrival time and ending at a leaving time as the actual staying time, and after the calculation is made, obtains the facility information based on the calculated staying time. In this case, server 200 obtains the staying time together with the destination information, and transmits the facility information identified by the staying time and the destination information to mobile terminal 100.

In a case where two or more pieces of the facility information are associated with a piece of the location information, mobile terminal 100 may notify the user of facility names corresponding to the two or more pieces of the facility information in the processing of step S24 to prompt the user to select one of them. By doing so, a location of a facility at which the user actually stays can be identified.

First determination unit 117 determines whether mobile terminal 100 is situated in a predetermined location by performing required processing. Specifically, the processing is performed by the navigation application, and, to be more precise, a setting of the destination is performed by the navigation application. It is possible to employ processing other than the processing performed by the navigation application, to be used for the determination as to whether mobile terminal 100 is situated in a predetermined location, which is performed by the navigation application. For example, in a case where a Near Field Communication (NFC) or other communication modules are provided with mobile terminal 100 and a device corresponding to the communication modules (reader/writer device, or the like) are provided with a facility located in the destination, it is possible to determine that mobile terminal 100 is situated in a predetermined location when information identifying the facility is obtained through communication between mobile terminal 100 and the device. To put it differently, information uniquely indicative of a facility can be deemed to be the same as the location information indicative of a location of the facility. Thus, obtainment of the information can be construed as one of the processings for determining whether mobile terminal 100 is situated in a predetermined location, which is described above.

A part of the functionalities of an information processing device according to the present invention may be provided with server 200, but not with mobile terminal 100. In this case, mobile terminal 100 may transmit information necessary for the determination of a stay with regard to mobile terminal 100, which includes the destination information and the staying time, to a server 200, and server 200 executes the series of processes shown in FIGS. 7 and 8 upon receipt of the information.

The present invention can also be construed as a program executed by an information processing device and a method of providing facility information in addition to the information processing device an information providing system having the information processing device(s). The program can be distributed by a storing medium including an optical disk or downloaded via a network to and installed at a computer.

What is claimed is:

1. An information processing device comprising:
   a first determination unit that determines whether a mobile terminal is situated in a predetermined location based on a result of predetermined processing executed by the mobile terminal using location information;
   a second determination unit that determines whether the mobile terminal has been staying at the location for a predetermined length of time upon determination of existence of the mobile terminal at the predetermined location, which is performed by the first determination unit; and
   an execution unit that executes processing to output information about a facility located in the location, upon determination of a stay of the mobile terminal at the predetermined location for the predetermined length of time, which is performed by the second determination unit,
   wherein when a predetermined condition with regard to determination of a stay of the mobile terminal is satisfied, the second determination unit sends to the user an inquiry on the mobile terminal as to a current location and determines that the mobile terminal has been staying at the location for the predetermined length of time upon receipt of a reply indicative that the user is at the location.

2. The information processing device according to claim 1, wherein:
   the processing is configured to guide the user of the mobile terminal to a destination; and
   the first determination unit determines that the mobile terminal is situated at the predetermined location when the user arrives at the destination.

3. The information processing device according to claim 1, wherein:
   the mobile terminal comprises a sensor that senses a motion of the mobile terminal; and
   the second determination unit determines the predetermined condition based on a result of the sensing performed by the sensor.

4. The information processing device according to claim 3, wherein:
   the second determination unit starts measurement of the staying time when the motion sensed by the sensor is less than a threshold, which indicates that the user is in the same location.

5. The information processing device according to claim 1, wherein:
   the predetermined location includes two or more locations; and
   the second determination unit performs the determination based on the predetermined length of time which is variable depending on a location determined by the first determination unit.

6. The information processing device according to claims 1, wherein the second determination unit changes the predetermined length of time depending on a date and/or time at which the determination is performed.

7. A method of providing information utilizing a mobile terminal, the method comprising:
   a first step of determining, by a first determination unit of a mobile terminal, whether the mobile terminal is situated in a predetermined location based on a result of predetermined processing executed by the mobile terminal using location information;
   a second step of determining, by a second determination unit of the mobile terminal, whether the mobile terminal has been staying at the location for a predetermined length of time upon determination of existence of the mobile terminal at the predetermined location, which is performed in the first step; and
   a third step of executing processing, by an execution unit of the mobile terminal, to output information about a facility located in the location, upon determination of a stay of the mobile terminal at the location for the predetermined length of time, which is performed in the second step,
   wherein when a predetermined condition with regard to determination of a stay of the mobile terminal is satisfied, the second determination unit sends to the user an inquiry on the mobile terminal as to a current location and determines that the mobile terminal has been staying at the location for the predetermined length of time upon receipt of a reply indicative that the user is at the location.

8. A program stored on a non-transitory computer readable medium for causing a processor coupled to a mobile terminal to execute:
   a first step of determining, by a first determination unit of the mobile terminal, whether the mobile terminal is situated in a location based on a result of predetermined processing executed by the mobile terminal using location information;
   a second step of determining, by a second determination unit of the mobile terminal, whether the mobile terminal has been staying at the location for a predetermined length of time upon determination of existence of the mobile terminal at the predetermined location, which is performed in the first step; and
   a third step of executing, by an execution unit of the mobile terminal, processing to output information about a facility located in the location, upon determination of a stay of the mobile terminal at the location for the predetermined length of time, which is performed in the second step,
   wherein when a predetermined condition with regard to determination of a stay of the mobile terminal is satisfied, the second determination unit sends to the user an inquiry on the mobile terminal as to a current location and determines that the mobile terminal has been staying at the location for the predetermined length of time upon receipt of a reply indicative that the user is at the location.

* * * * *